E. T. SILVIUS.
CREDIT ACCOUNT REGISTER.
APPLICATION FILED JULY 22, 1912.
1,135,215.
Patented Apr. 13, 1915.
4 SHEETS—SHEET 2.
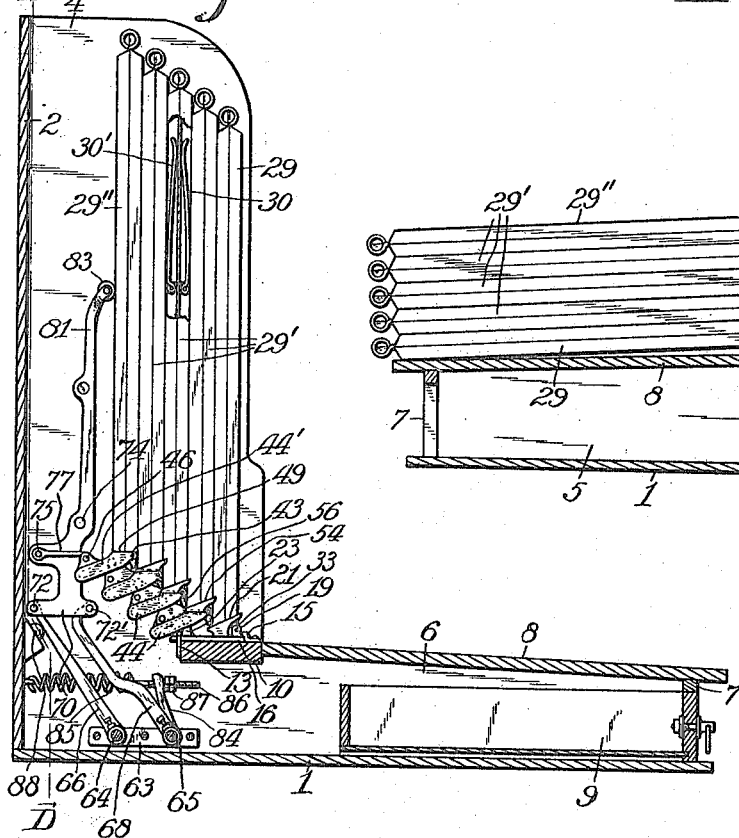
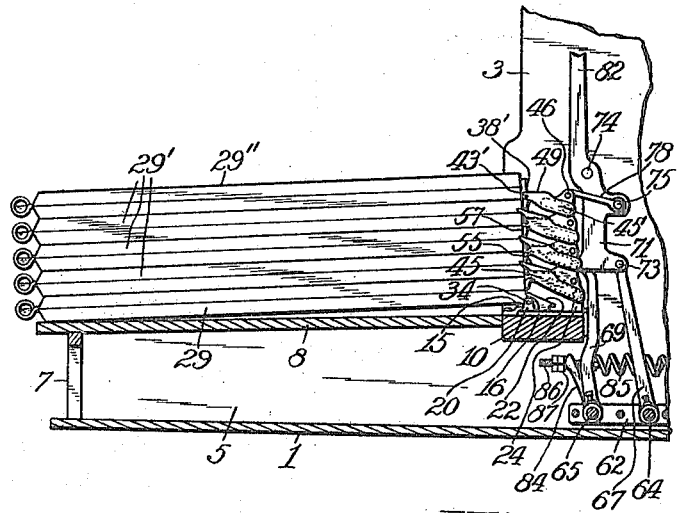
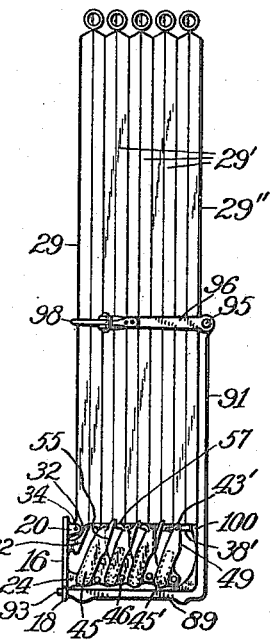
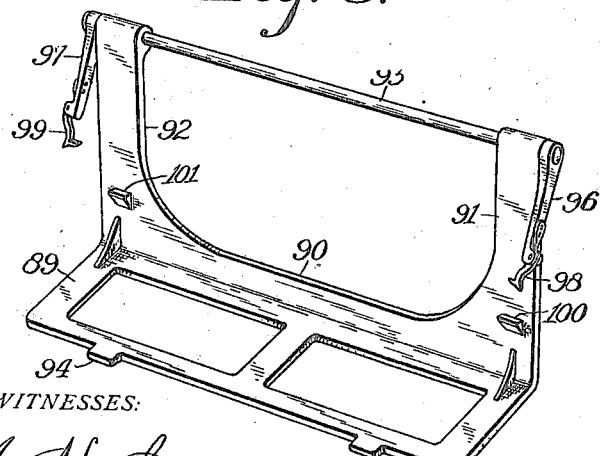
WITNESSES:
J. H. Gardner.
M. J. Messenheimer.
INVENTOR:
Ellis T. Silvius.

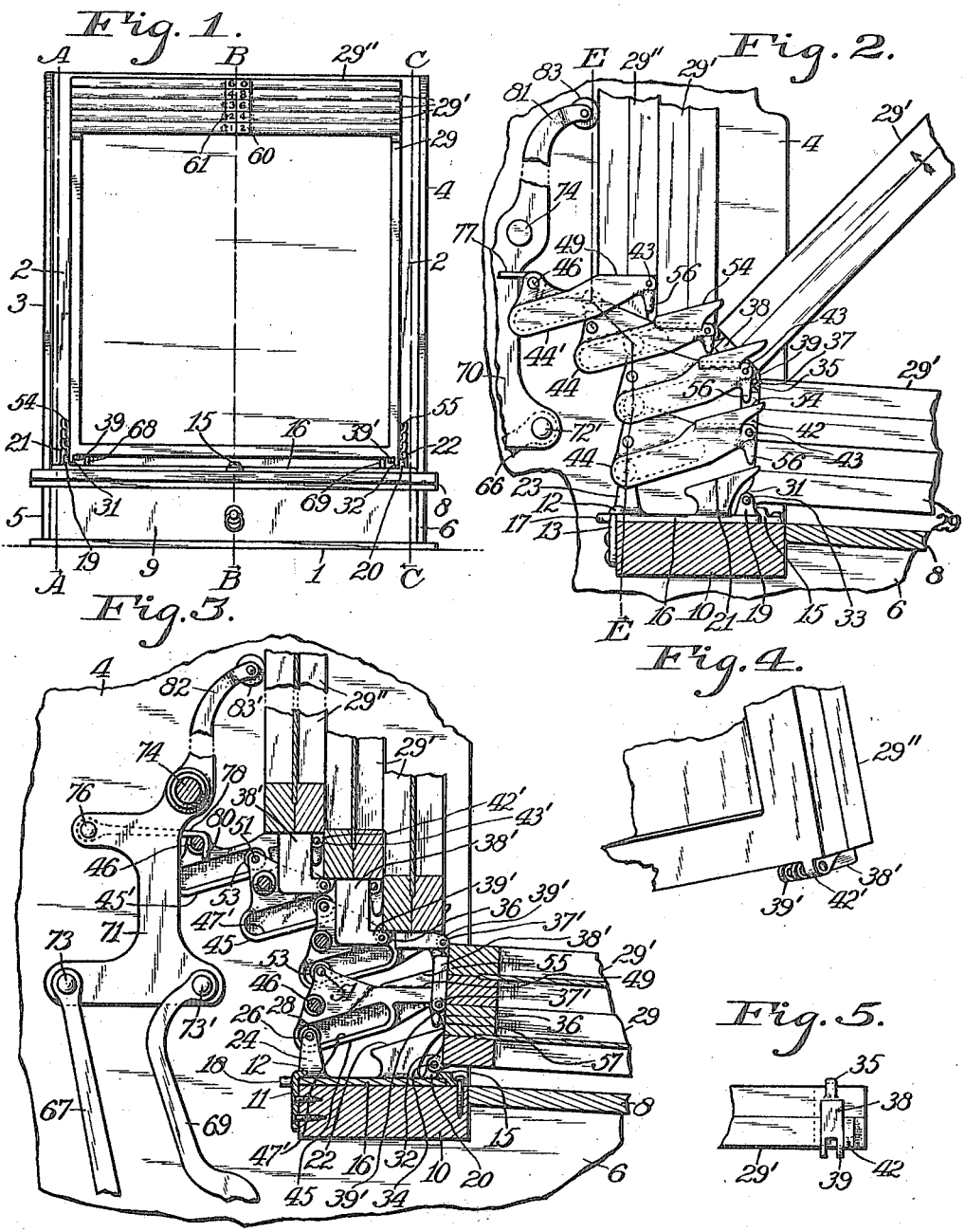

E. T. SILVIUS.
CREDIT ACCOUNT REGISTER.
APPLICATION FILED JULY 22, 1912.
1,135,215.
Patented Apr. 13, 1915.
4 SHEETS—SHEET 3.
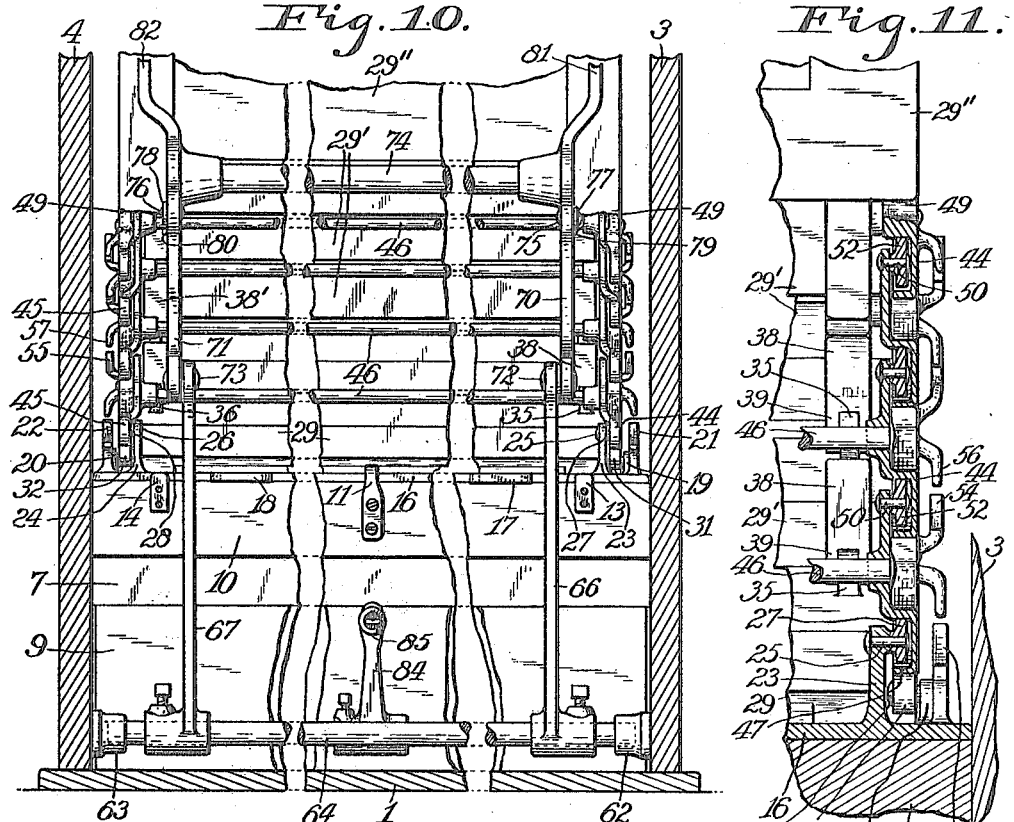
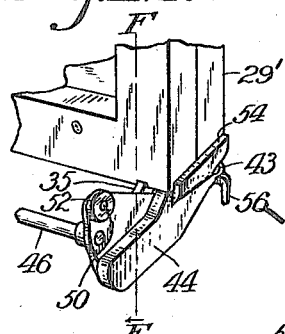
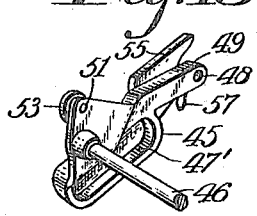
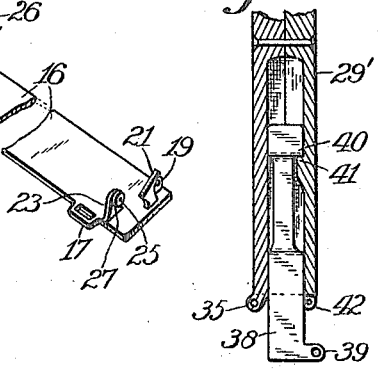
WITNESSES:
J. H. Gardner.
M. J. Messenheimer.
INVENTOR:
Ellis T. Silvius.

E. T. SILVIUS.
CREDIT ACCOUNT REGISTER.
APPLICATION FILED JULY 22, 1912.
1,135,215.
Patented Apr. 13, 1915.
4 SHEETS—SHEET 4.
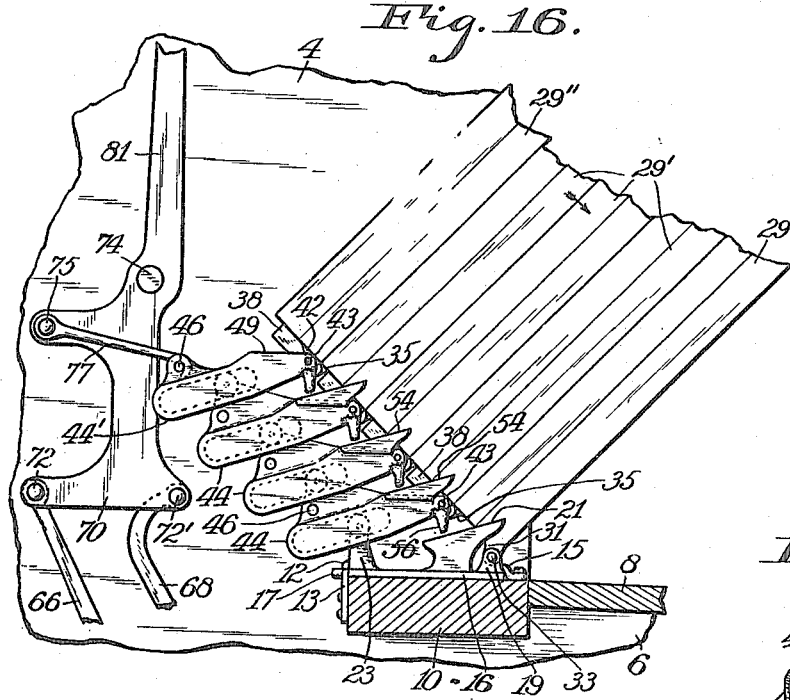
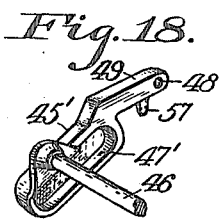
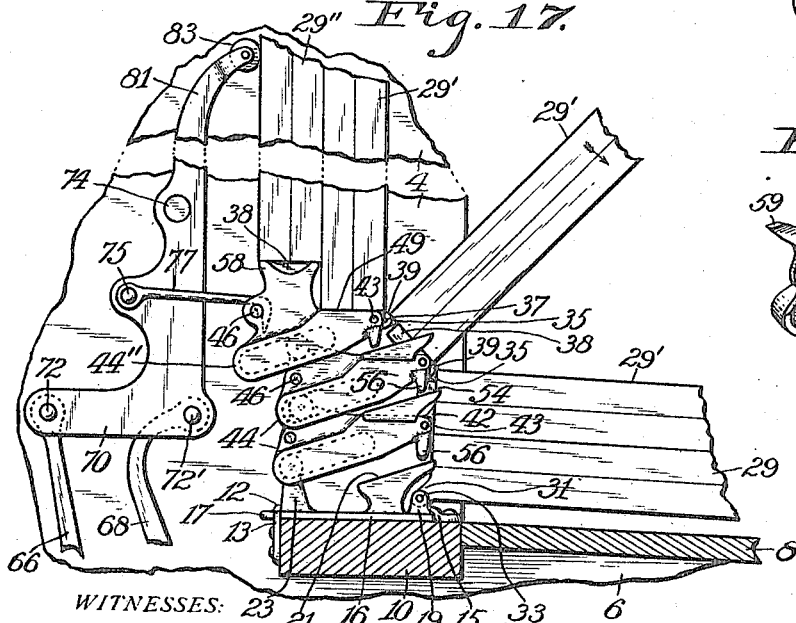
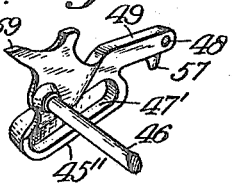
WITNESSES:
J. H. Gardner
M. J. Messenheimer
INVENTOR:
Ellis T. Silvius

UNITED STATES PATENT OFFICE.

ELLIS T. SILVIUS, OF INDIANAPOLIS, INDIANA, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

CREDIT-ACCOUNT REGISTER.

1,135,215.  Specification of Letters Patent.  Patented Apr. 13, 1915.

Application filed July 22, 1912. Serial No. 710,905.

*To all whom it may concern:*

Be it known that I, ELLIS T. SILVIUS, a citizen of the United States, residing at Indianapolis, in the county of Marion and State of Indiana, have invented a new and useful Credit-Account Register, of which the following is a specification, reference being had to the accompanying drawings, and to the letters and figures of reference marked thereon.

This invention relates to appliances for filing or preserving commercial or other papers for future reference, more especially for filing credit account bills or slips commonly used in the conduct of mercantile business in lieu of book accounts, and the invention has reference more particularly to leaves or frames for systematically holding the papers, the invention having reference more especially to means for hingedly connecting the leaves together and means for supporting and controlling the operation of the leaves or frames.

The principal object of the invention is to provide improved hinging and supporting means for filing leaves or frames that shall be so constructed as to be capable of supporting the leaves or frames uprightly in echelon, and permit them to collectively assume the form of a rectangular pack, when moved to prone position or when it may be desired to conveniently store the leaves or frames in a safe place when not in use.

A further object is to provide apparatus of the above mentioned character of simple construction and which may be produced without requiring great accuracy or machine work, and be reliable in operation.

A still further object is to provide improved supporting and hinging connections for filing leaves or frames that shall be so constructed as to be permanently connected with the leaves or frames, and be adapted to be removably inserted into a casing and support the leaves or frames in echelon without necessitating the use of supporting connections permanently connected to the casing, which supporting means shall be so constructed as to be capable of supporting the leaves or frames with relatively small amount of rise in the stepping arrangement, in order that the rearward leaves shall not stand excessively high in the casing, especially when a large number of leaves or frames are required.

Another object of the invention is to provide improved means for automatically assisting the leaves from prone to upright normal position and for normally holding them in normal position, a further object being to provide an improved holder on which to carry or support the leaves in compact arrangement when not in use.

The invention consists in a filing cabinet or register comprising a casing, a base plate removably secured in the casing, a plurality of leaves or frames provided with adjustable hinging connections, and means connected with the leaves or frames and supported by the base plate for supporting the leaves uprightly in echelon.

The invention includes also means mounted in the casing for assisting the leaves or frames to rise from prone to upright position and for maintaining the remaining leaves in normal position when one or more of the forward leaves are moved to prone position and move the rearward leaves forwardly.

The invention consists also in the novel parts and in the combinations and arrangements of parts as hereinafter particularly described and claimed.

Referring to the drawings, Figure 1 is a front elevation of the improved credit account register or filing cabinet; Fig. 2, a fragmentary sectional elevation on the plane of the line A A in Fig. 1 with the leaves or frames in various different positions; Fig. 3, a fragmentary section on the plane of the line B B in Fig. 1 with the leaves in various different positions; Fig. 4, a fragmentary perspective view of one of the leaves or frames; Fig. 5, a fragmentary end view of one of the leaves inverted; Fig. 6, a vertical section approximately on the plane of the line A A; Fig. 7, a fragmentary section approximately on the plane of the line C C in Fig. 1, but with all the leaves in prone position; Fig. 8, a perspective view of an improved holder for the leaves or frames; Fig. 9, a side elevation of a pack of leaves secured in the improved holder; Fig. 10, a fragmentary vertical section approximately on the line D D in Fig. 6, with two of the leaves in prone position and three in normal position; Fig. 11, a fragmentary section approximately on the line E E in Fig. 2; Fig. 12, a fragmentary perspective view of one of the leaves or frames and an echelon block connected thereto; Fig. 13, a perspective view of the improved leaf base; Fig. 14, a fragmentary section of one of the leaves and adjustable hinge thereof; Fig. 15, a perspective view of one of the echelon blocks; Fig. 16, a fragmentary sectional elevation on the line A A but with all the leaves in mid-position; Fig. 17, a fragmentary sectional elevation also on the line A A but with the leaves in various different positions and showing modifications with respect to the echelon blocks; Fig. 18, a perspective view of a modified form of echelon block, and Fig. 19, a perspective view of another modified form of echelon block.

Similar reference characters throughout the various figures of the drawings, indicate corresponding elements or features of construction herein referred to.

The casing comprising a part of the filing cabinet may be variously constructed and preferably comprises a bottom 1 on which is an upright back 2 to which two sides 3 and 4 are attached, the lower portions of the sides having relatively low forwardly extending portions 5 and 6 respectively provided with a front 7 and a suitable top 8, a drawer 9 being inserted into the front 7, the forward portion of the casing constituting a desk-like structure adapted to support the forward portions of the leaves in prone position when it is desired to place papers on the leaves or gain access to the papers filed thereon. A foundation rail 10 is suitably supported in the casing at the rear end of the top 8 at suitable distances from the bottom 1 and from the back 2. The rear portion of the rail is provided with a stop 11 which extends above the plane of the top of the rail and has a projection 12 thereon extending forwardly above the top of the rail, two other stops 13 and 14 preferably being secured also to the rear side of the rail 10 and projecting higher than the top thereof. The forward portion of the rail is provided with a button 15 or other suitable catch for securing a base plate fixedly upon the rail.

The improved base plate 16 with which the leaves or frames are provided is substantially flat and relatively narrow in one dimension and its normally rear portion is preferably provided with two catch loops 17 and 18, the normally forward portion of the plate having two pivot stands 19 and 20 thereon and preferably having also two rearwardly facing inclined guides 21 and 22. The rearward portion of the plate has two posts 23 and 24 thereon provided with guide pins 25 and 26 extending outwardly substantially parallel with the top of the plate, the pins preferably having rollers 27 and 28 thereon respectively. The plate is placed removably upon the rail 10 against the stops at the rear of the rail and secured under the projection 12 and the securing device 15.

A front leaf or frame 29, a suitable number of intermediate leaves 29' and a rear leaf 29", are provided, which may be variously constructed in detail and are substantially alike excepting as to slight modification in the devices for connecting the leaves or frames together and supporting them. Each leaf is provided with suitable means such as bill clamps 30 and 30' for securing papers thereto. The normally lower forward portion of the front leaf 29 is provided with two hinging ears 31 and 32 provided with pivots 33 and 34 respectively, whereby they are hingedly or pivotally connected respectively to the pivot stands 19 and 20. The normally lower rearward portion of the front leaf is provided with two hinging ears 35 and 36 provided respectively with pivots 37 and 37', each of the intermediate leaves being provided also with the hinging ears 35 and 36 for the pivots at their lower rear portions. Each one of the intermediate leaves and the rear leaf are provided each with a pair of longitudinally movable hinge bars 38 and 38' that are mounted in suitable guideways in the side portions of the leaves or frames, and the bars have forwardly extending hinging ears 39 and 39' respectively that are connected with the pivots 37 and 37' respectively of the next forwardly adjacent leaf or frame. The hinge bars are each provided with a head 40 that is stopped in its outward movement against a shoulder 41 formed in the guideway. The forward portion of the lower end of each leaf, excepting the front one, is provided with two pivot ears 42 and 42' having pivot pins 43 and 43' respectively.

A suitable number of echelon blocks 44 and 45, being of right and left hand design but otherwise substantially alike, are provided and connected at their forward ends to the pivot pins 43 and 43' respectively carried by the intermediate leaves, two blocks 44' and 45' slightly modified, or two other blocks 44" and 45" further modified being similarly connected with the pivots 43 and 43' respectively carried by the rear leaf 29". Each pair of echelon blocks, a right hand and a left hand one, preferably are connected together at their rearward portions by means of a tie rod 46, and the two blocks of the pair have inclined guideways 47 and 47' therein respectively, the degree of inclination of the guideway depending upon the height of the stepping desired, it being preferable that the extent of rise for each leaf relative to the adjacent one shall be less than the thickness of the leaf, and if it be desired that the rise shall be equal to the thickness of a leaf, it should be understood that the guideway will not be inclined but will be relatively horizontal. The forward ends of the blocks have each a pivot hole 48 therein, to receive the pivots 43 and 43'. The upper forward portion of each echelon block has a relatively horizontal seat 49 upon which a portion of the lower end of a leaf or frame normally rests in vertical position, the lower end of the leaf being at right angles to the plane of the body of the leaf. The guideways of the echelon blocks that are connected to the foremost one of the leaves receive the rollers 27 and 28 whereby the rearward portion of the blocks are supported and guided. The blocks 44 and 45 are provided with lateral guide pins 50 and 51 on their rearward upper portions respectively, the pins preferably having rollers 52 and 53 thereon respectively that are received in the guideway of the remaining blocks above them respectively, so that while the lowermost pair of echelon blocks are supported by the base plates they movably support and guide another pair which in turn supports and guides another pair, the normally forward ends of the blocks being supported and guided by the leaves at times during operation and support the leaves in normal rest position.

In order to guard against forcing the forward ends of the blocks downward abnormally when operating the leaves, the forward portions of the blocks 44 and 45 are provided with rearwardly inclined guides 54 and 55 respectively that correspond to the guides 21 and 22, and the forward portions of the blocks 44 and 45 and also the blocks 44' and 45' and the blocks 44'' and 45'' are provided respectively with lateral projections 56 and 57 that are normally slightly above the plane of the inclined guides but may be brought into contact therewith during rapid movement of the leaves or frames on their hinges, the lowermost pair of blocks being thus steadied by the guides 21 and 22 and the guides of each pair of blocks steadying the next adjacent blocks above them. The inclined guides extend along the side edges of the leaves and assist in preventing twisting movement of the group of leaves. The uppermost pair of blocks 44' and 45' preferably are devoid of the inclined guides but obviously may be provided with them if desired. In some cases it may be desirable to add an additional rear leaf without increasing the number of echelon blocks, in which case a pair of blocks 44'' and 45'' are employed instead of the blocks 44' and 45', and they are provided with additional horizontal leaf seats 58 and 59 respectively that are arranged suitably higher than the seats 49, the blocks being in other respects substantially like the blocks 44' and 45', and the rearmost leaf is supported upon the rearward portion of the two blocks while the next forwardly adjacent leaf is supported upon the forward portion of the blocks.

The forward portions of the upper ends of the leaves are provided with suitable indexing characters 60 and 61 as is customary, the characters on each leaf being visible to the attendant when at the front of the cabinet. When the leaves are in normal position each leaf stands firmly in vertical position upon its seats excepting the front leaf which is pivotally supported and the rearward portion thereof supported by means of the ears 35 and 36 resting upon the base plate 16, the hinge bars 38 and 38' being drawn downward relative to the leaves in which they are mounted, so that the hinge bars do not directly support the leaves excepting during pivotal movement of the leaves, being primarily provided to serve as adjustable hinging connections, and obviously various adjustable hinging connections may be substituted therefor if desired.

It should be understood that while the filing leaves or frames have for convenience been referred to as normally vertical and independently so maintained by the force of gravity, they may be so arranged that their upper ends shall lean slightly toward the back of the casing, and may be stopped by the back when such a large number of leaves are employed as to bring a preponderance of weight rearward of the supporting posts 23 and 24 and induce tilting of the group over toward the back.

When a relatively large number of filing leaves or frames are desired it is preferable to provide means for assisting the leaves to rise and for preventing the group from tilting rearward, it being understood, however, that in case the upper portions of the rearward leaves were inclined to fall rearwardly the upper portions of the forward leaves would be forced forwardly. Preferably two supports 62 and 63 are secured to the sides 3 and 4 or otherwise to the casing at the bottom thereof and they rotatably support two shafts 64 and 65, the shaft 64 having two arms 66 and 67 rigidly secured thereto that extend upwardly, the shaft 65 having two arms 68 and 69 secured thereto and extending upward substantially parallel to the arms 66 and 67 respectively. A head is employed which preferably comprises two members 70 and 71, the member 70 being connected by means of two pivots 72 and 72' to the arms 66 and 68 and the member 71 connected by means of two pivots 73 and 73' to the arms 67 and 69 respectively, and a tie bar 74 is secured to the two members. The members 70 and 71 are provided with pivots 75 and 76 respectively to which two links 77 and 78 are respectively connected, the links being provided respectively with hooks 79 and 80 that are detachably connected with the tie rod 46 of the uppermost pair of echelon blocks. The members 70 and 71 preferably are provided with abutment arms 81 and 82 that extend upward behind the rearmost leaf and preferably are provided with rollers 83 and 83' supported in contact with the leaf, so that in case the leaf is moved forcibly back against the rollers the arms are prevented from being forced rearward, since the links are connected with the blocks to which the rear leaf is pivoted and the abutment is maintained in vertical position during movement by the parallel arms.

In order to assist the operator to raise the leaves from prone position a short arm 84 is secured rigidly to the shaft 65, and a coil spring 85 is connected to the back 2 of the casing and provided with an adjusting rod 86 extending through the arm 84 and provided with adjusting nuts 87, for adjusting the tension of the spring to draw the head and abutment arms and also the leaves rearwardly. The back 2 preferably is provided with cushions 88 against which the arms 66 and 67 are stopped noiselessly. The rearwardly exerted power of the spring assists in holding up the rearward portions of the echelon blocks.

In order to carry the group of leaves as a rectangular pack a suitable holder therefor comprises a floor plate 89 and an integral front plate 90 having arms 91 and 92 thereon, and the floor plate is provided with latching projections 93 and 94 to be received into the catch loops 17 and 18 when the leaves are placed upon the holder. A shaft 95 is rotatably mounted in the arms 91 and 92 and has arms 96 and 97 fixed thereon, the arms being provided with catches 98 and 99, respectively. The holder is provided with ledges 100 and 101 upon which the lower end of the rear leaf is supported, the front leaf being supported by the base plate 16 arranged on edge.

In practical use such papers as are required to be filed are placed upon the leaves or frames and suitably secured thereto or retained thereon as may be desired, and the leaves normally are bodily supported upon the leaf seats and stand in approximately upright position. When it is desired to have access to one of the leaves, such leaf and those, if any, in front of it are drawn forward from the leaf seats to prone position and then if desired one or more other leaves may also be drawn forward, or one or more of those in prone position may be returned to normal position. All the leaves obviously may be drawn forward to prone position as illustrated particularly in Fig. 16, and when the leaves are in mid position the plane of their normally lower ends coincides with the forward ends of all the echelon blocks and thus remains until the leaves descend to prone position in rectangular arrangement. When the leaves are returned to normal position on their blocks the hinge bars of the leaves are drawn downwardly by the adjacent forward leaves. During the forward movement of the leaves the abutment is drawn forward against the pressure of the spring 85, and the spring assists to raise the leaves after they are lifted slightly by the operator, and obviously may be made sufficiently strong to always draw the leaves up from prone position when not held down by hand or weight. When it is desired to remove the leaves from the casing and store them in a safe place, the hooks 79 and 80 are disconnected from the tie rod 46. The base plate 16 is released from the rail 10 and the leaves moved to prone position and then lifted with the base plate and devices connected therewith and placed on the holder as shown in Fig. 9, with the rear leaf against the arms 91 and 92, the base plate being connected to the floor plate 89, and the catches 98 and 99 are brought into engagement with the front leaf 29.

Having thus described the invention, what is claimed as new is:—

1. A filing leaf having a supporting echelon block provided with an approximately horizontal leaf seat for bodily supporting a leaf and pivotally connected thereto, and having also a relatively adjustable pivot for connection with another leaf.

2. A filing leaf provided with a supporting block pivoted thereto, the block having an approximately horizontal leaf seat for bodily supporting a leaf in upright position and being provided with means for its support.

3. A filing leaf provided with a supporting block pivoted thereto, the block having a seat normally supporting the leaf bodily in upright position and having also another seat for uprightly and bodily supporting another leaf.

4. A filing leaf having an echelon block pivotally connected thereto and having also a pivot for connection with another leaf, the block having an approximately horizontal seat thereon for bodily supporting the leaf in upright position.

5. A filing appliance including a plurality of echelon blocks movably guided, and a plurality of leaves pivoted respectively to a block and to an adjacent one of the leaves on a common axis, the pivotal connections between the leaves being relatively adjustable.

6. A filing leaf provided with an adjustable guiding pivot movably supporting the leaf in inclined position, and a block pivoted to the leaf and movable by means of the adjustable guiding pivot and having a seat normally supporting the leaf in upright position independently of the pivot.

7. A filing leaf having an echelon block pivotally connected thereto and having also an adjustable pivot and non-adjustable pivot for connection with other leaves, the block having a seat for supporting the leaf in upright position.

8. A filing leaf provided with an adjustable guiding pivot movably supported, and provided also with a pivoted block for supporting the leaf when the pivot is adjusted to non-supporting position, the pivot supporting the leaf in another adjusted position.

9. A filing appliance including an echelon block having a leaf seat thereon, means for movably guiding the block, a leaf pivoted to the echelon block and removably supported uprightly upon the seat, and means for pivotally guiding the leaf when removed from the seat.

10. A filing appliance including a leaf pivotally supported, a guide, a hinge device pivoted to the leaf, a second leaf movably guided on the hinge device, and an echelon block pivoted to the movably guided leaf and partially supported on the guide for uprightly supporting the movably guided leaf.

11. A filing appliance including an echelon block having a guideway and also a leaf seat extending at different angles, a guide supporting the guideway, a leaf pivoted to the echelon block and removably supported uprightly upon the seat, and means for pivotally guiding the leaf when removed from the seat.

12. A filing appliance including a base having an inclined guide thereon, a leaf pivoted to the base, a hinge device pivoted to the leaf, a second leaf movably guided on the hinge device, and an echelon block pivoted to the movably supported leaf and movably mounted on the inclined guide for uprightly supporting the movably guided leaf.

13. A filing appliance including a plurality of filing leaves, means hingedly connecting the leaves adjustably together, a pivotal support for the foremost one of the leaves, a plurality of echelon blocks pivoted respectively to the remaining leaves and having seats thereon bodily supported the leaves uprightly independently of the hinging means, and means for movably guiding the blocks.

14. A filing appliance including a plurality of filing leaves connected together for relative pivotal movement, a pivot supporting the foremost one of the leaves, and a plurality of blocks movably guided in inclined planes and pivotally connected respectively to the remaining leaves, the leaves being supported respectively upon the blocks and normally maintained independently in vertical position by force of gravity.

15. A filing appliance including a base, a plurality of filing leaves adjustably hinged together to permit relative longitudinal movement, the foremost one of the leaves being pivotally supported on the base, each one excepting the foremost one of the leaves having an echelon block pivoted thereto for directly supporting the leaf in upright position, each block having a seat thereon for the leaf, and means for guiding the blocks in inclined planes.

16. A filing appliance including a plurality of filing leaves hingedly connected together, a pivotal support for the foremost one of the leaves, a plurality of superimposed blocks pivotally connected respectively to the remaining leaves and having seats thereon normally supporting the leaves bodily in upright position, the blocks being movably supported in inclined position on the adjacent lower blocks, and means for movably supporting the lowermost one of the blocks.

17. A filing appliance including a base having a guide pin and also an inclined guide thereon, a leaf pivoted to the base in proximity to the inclined guide, a hinge device pivoted to the leaf, a second leaf movably guided on the hinge device, and an echelon block pivoted to the movably guided leaf and adapted to coöperate for support with the inclined guide, the block having a seat thereon for uprightly supporting the movably guided leaf and having also a relatively inclined guideway movably mounted on the guide pin.

18. A filing appliance including a plurality of echelon blocks, means for guiding the blocks in inclined planes, a plurality of filing leaves hingedly connected together and movable longitudinally relatively one to another, the foremost one of the leaves being pivotally supported, the remaining leaves excepting the rearmost leaf being pivotally connected to the plurality of blocks and normally supported respectively in upright position thereon independently of the pivotal connection, and devices on the rearmost blocks for bodily supporting also the rearmost leaf independently of its pivotal connection with the adjacent leaf.

19. A filing appliance including a plurality of filing leaves, a plurality of echelon blocks movably supported in inclined planes one above another and pivotally connected respectively to all excepting the foremost one of the leaves, each block having a seat thereon, hinge devices movably connected respectively with all excepting the foremost one of the leaves and pivotally connected with adjacent forward leaves forwardly of the connection with the blocks, the leaves being movable away from adjacent leaves and over onto and bodily supported upon the seats, and a pivot supporting the foremost one of the leaves.

20. In a credit account register, the combination with a base, of a plurality of filing leaves normally arranged uprightly face to face, the foremost one of the leaves being pivotally connected to the base, the remaining leaves having each a plurality of hinging devices that are freely movable thereon and are pivotally connected to the adjacent forward leaves, a plurality of pairs of connected echelon blocks pivotally connected in pairs respectively to all excepting the foremost one of the leaves and normally supporting the leaves uprightly in echelon independently of the hinging devices, and means for supporting and guiding the blocks.

21. In a credit account register, the combination of a plurality of filing leaves, hinge bars movably guided in the leaves respectively, and a plurality of echelon blocks pivotally connected each to a hinge bar and having a guideway in one side thereof, each black having also a lateral projection normally guided in the guideway of an adjacent block.

22. In a credit account register, the combination with a base, and a plurality of filing leaves hingedly connected together and permitting relatively longitudinal movement, the foremost one of the leaves being pivotally supported on the base, of two guide rollers mounted on the base, and a plurality of pairs of echelon blocks arranged in echelon, each block having an inclined guideway and also a guide roller, the blocks being pivotally connected in pairs respectively to all excepting the foremost one of the leaves, the guideways of the blocks of one pair being mounted on the rollers that are on said base, the guideways of the blocks of the remaining pairs being mounted on the rollers of the adjacent lower blocks.

23. In a credit account register, the combination of a plurality of echelon blocks movably supported in inclined planes one above another, each block having a horizontal leaf seat on its forward portion, and a plurality of filing leaves of which the foremost one is pivotally supported independently of the blocks, the remaining leaves being pivotally connected with the forward portions of the blocks respectively and normally supported bodily in upright position upon the adjacent seats, each leaf excepting the foremost one being provided with relatively movable devices for connecting the leaf to the next adjacent forward leaf.

In testimony whereof, I affix my signature in presence of two witnesses.

ELLIS T. SILVIUS.

Witnesses:
J. H. GARDNER,
P. A. HAVELICK.

Copies of this patent may be obtained for five cents each, by addressing the "Commissioner of Patents, Washington, D. C."